Oct. 30, 1934.    D. F. HALL ET AL    1,978,672
BEET HARVESTER MACHINE
Filed Dec. 21, 1932    4 Sheets-Sheet 1
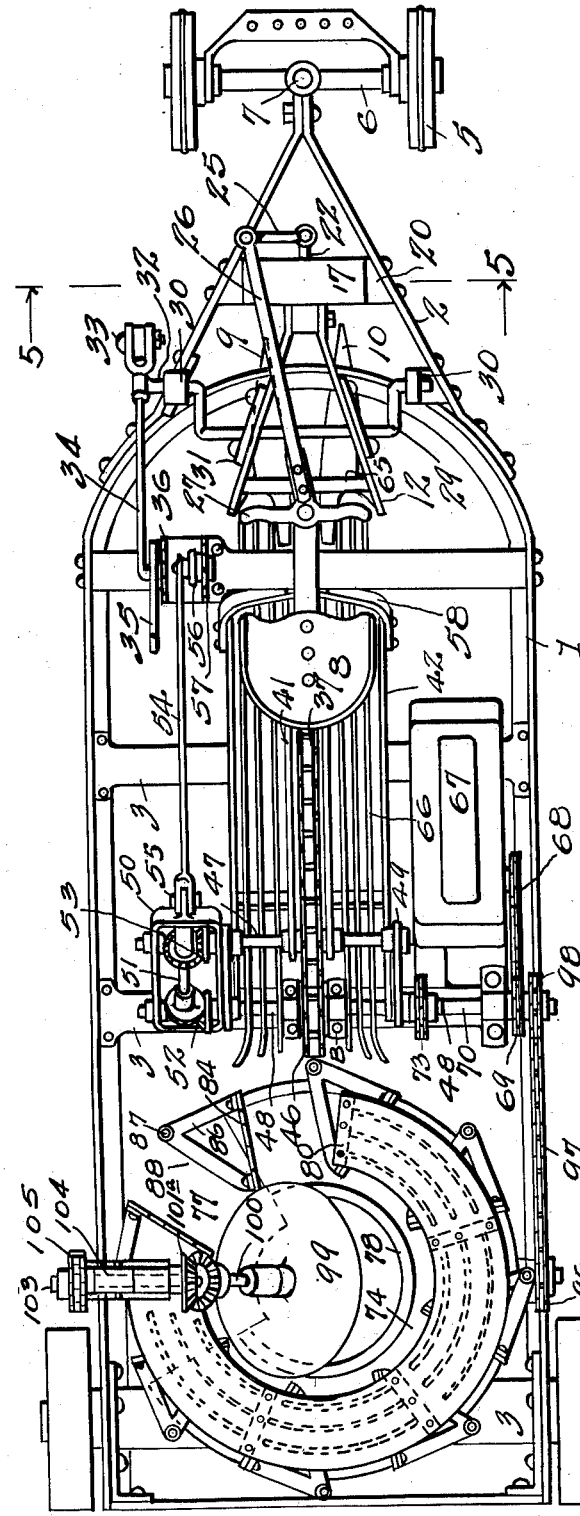
Inventors
DWIGHT F. HALL
WALTER A. MORKERT
Herbert E. Smith
Attorney

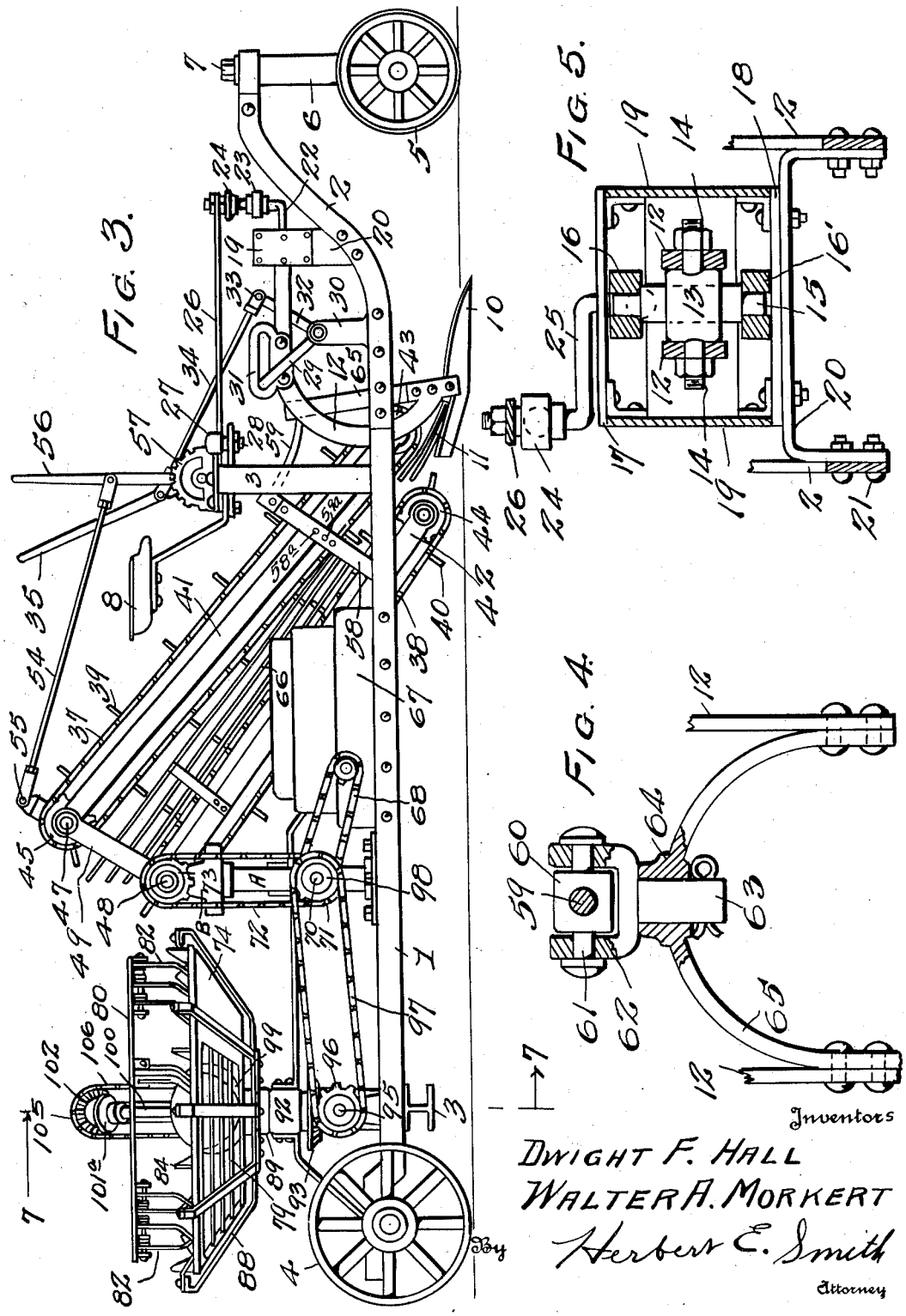

Oct. 30, 1934.  D. F. HALL ET. AL  1,978,672
BEET HARVESTER MACHINE
Filed Dec. 21, 1932  4 Sheets-Sheet 3
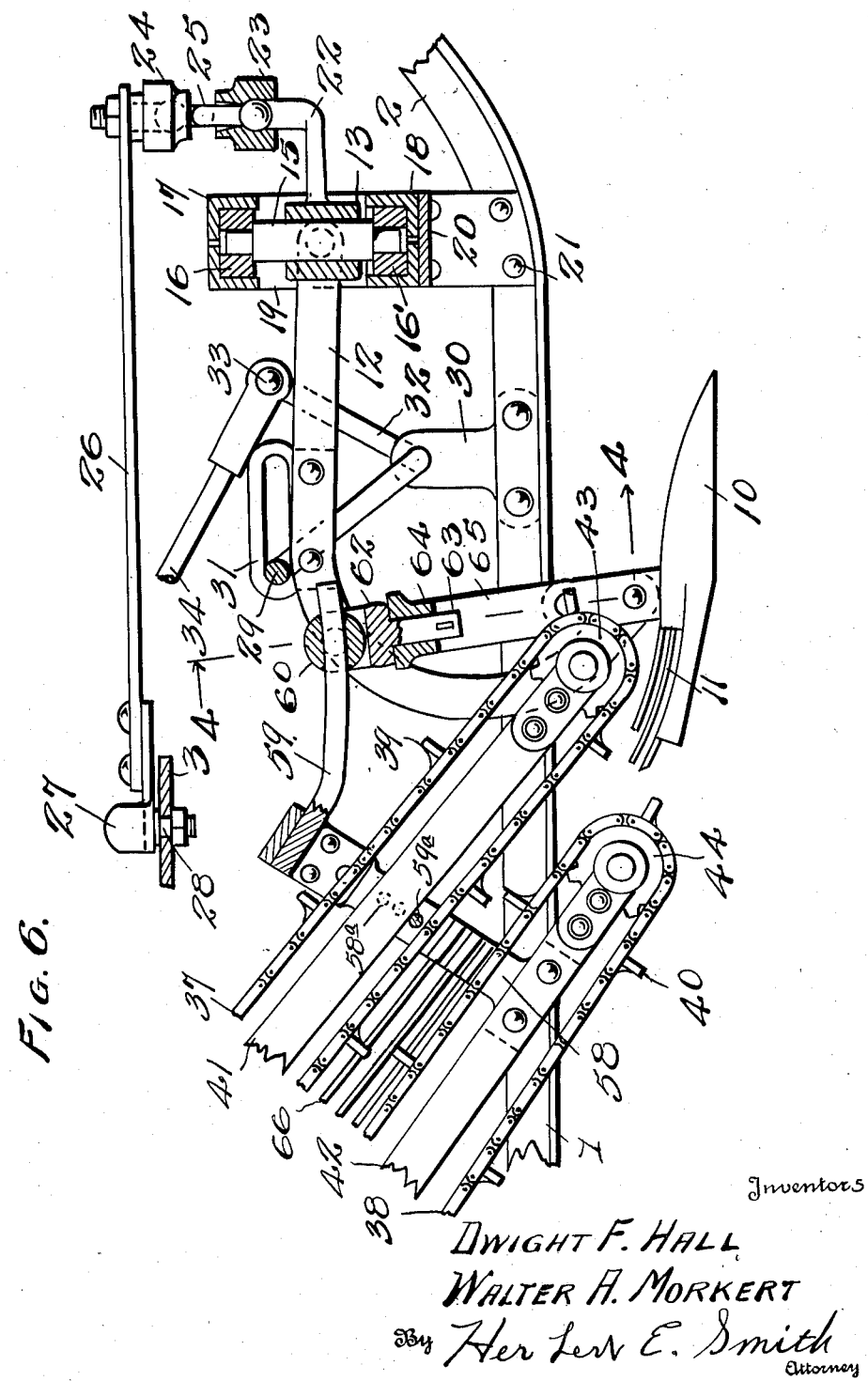
Inventors
DWIGHT F. HALL
WALTER A. MORKERT
By Her Lew E. Smith
Attorney Oct. 30, 1934.  D. F. HALL ET AL  1,978,672
BEET HARVESTER MACHINE
Filed Dec. 21, 1932  4 Sheets-Sheet 4

Inventors
DWIGHT F. HALL
WALTER A. MORKERT
By Herbert E. Smith
Attorney

Patented Oct. 30, 1934

1,978,672

UNITED STATES PATENT OFFICE 1,978,672

BEET HARVESTER MACHINE

Dwight F. Hall and Walter A. Morkert, Polson, Mont.

Application December 21, 1932, Serial No. 648,228

10 Claims. (Cl. 55—9)

Our present invention relates to improvements in beet harvesters of the type employing a wheeled vehicle, which may be propelled over the field in suitable manner for the purpose of uprooting or digging the growing beets. The implement is designed to elevate or convey the uprooted beets, butt-end first, to a topping mechanism where the leaves, or foliage, is removed by severing the butt-end from the beet.

In carrying out our invention a pair of plows or shovels are employed as the "pullers" for uprooting the beets, successively, as the implement travels along a row of the vegetables, and the beets are gripped between an upper endless conveyer and a lower endless conveyer, forming the elevator. The elevator conveys the beets to the topping mechanism, and the latter includes rotary feed mechanism by means of which the beets are conveyed to position where they are operated on by a rotary cutter, and the latter is adapted to sever the butt-ends from the beets, after which the tops and the bodies of the beets are separately collected in suitable manner for usual disposition.

The invention consists in certain novel combinations and arrangements of parts involving the plows and plow frames or beams and means for lifting or adjusting them; in the novel arrangement by means of which the plow frames are coupled with the elevator, and in certain novel combinations and arrangements of parts for adjusting the elevator; and in certain novel combinations and arrangements for feeding the beets to the topping device or rotary cutter, all as will hereinafter be more fully set forth and claimed.

In the accompanying drawings we have illustrated one complete example of the physical embodiment of our invention, wherein the parts are combined and arranged according to one mode we have thus far devised for the practical application of the principles of our invention. It will be understood, however, that changes and alterations may be made in the exemplified structure, within the scope of our appended claims, without departing from the principles of our invention.

Figure 1 is a plan view of the beet harvester embodying our invention.

Figure 2 is a top plan view of the rotary feed device employed in connection with the rotary cutter or topping mechanism for the beets.

Figure 3 is a side elevation of the harvester in operative position.

Figure 4 is an enlarged detail view at line 4—4 of Figure 6 showing the flexible three-way joint between the elevator and the plow beams.

Figure 5 is a transverse, vertical sectional view at line 5—5 of Figure 1 showing the steering head for the pullers or plows forming a flexible coupling between the plow beams and the main frame and means for laterally adjusting and lifting the pullers or plows.

Figure 6 is an enlarged view in elevation with parts in section showing the two flexible joints between the front ends of the endless conveyers forming the elevator, the plow beams, and the main frame.

Figure 7:
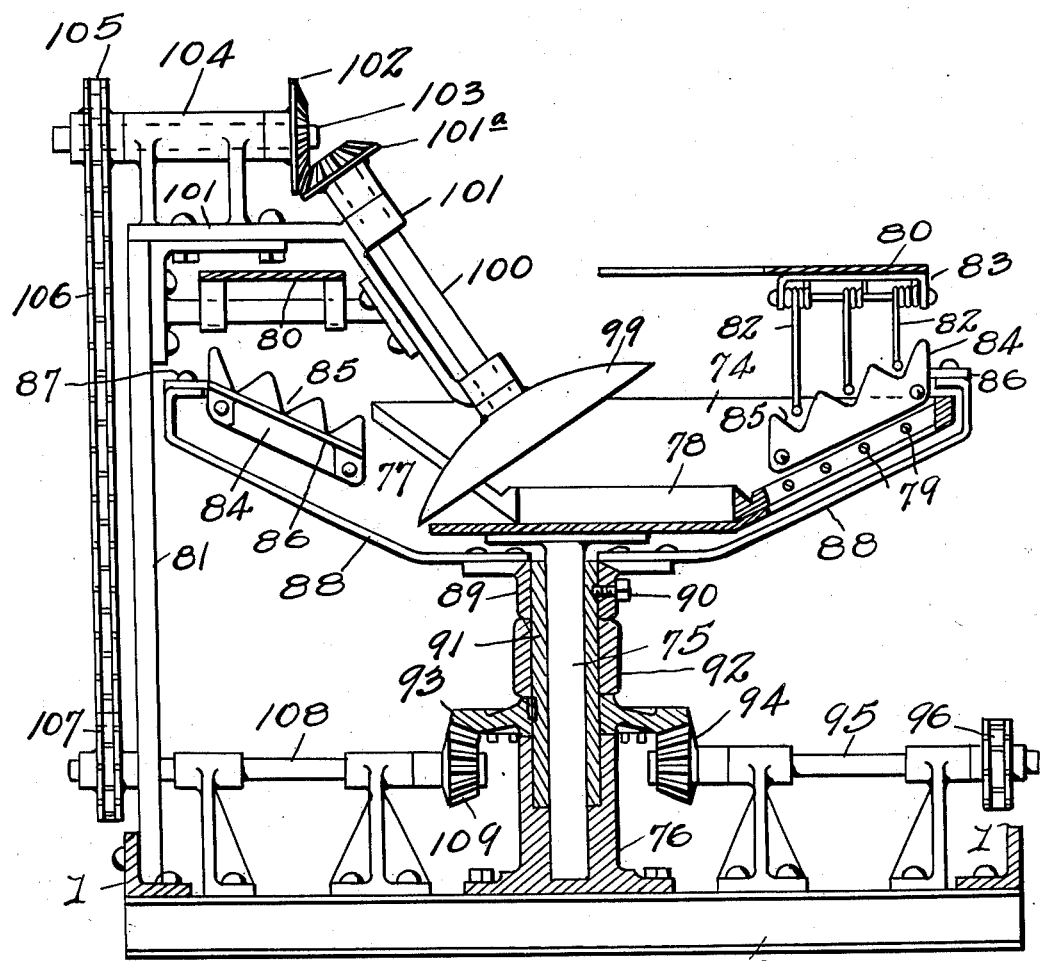
Figure 7 is a vertical sectional view at line 7—7 of Figure 3 showing the topping mechanism.

In the form of the invention illustrated in our drawings the implement comprises a main frame 1, and a front section 2 rigidly fastened thereto, cross braces 3 being employed as required for rigidly joining parts of the main frame and to provide supports for operating parts of the implement.

The implement is provided with suitable rear wheels as 4 and front wheels 5, and the truck 6 of the front wheels is equipped with usual or suitable draft appliances for the attachment of propelling means, either mechanical power or horse power. The steering wheels are pivoted on the king pin 7, and the driver occupies the seat 8, and it will be understood that the implement is propelled or drawn along the row of beets for the purpose of uprooting the beets, successively, from the soil. For this purpose we employ two longitudinally extending and laterally spaced plows or shovels 9 and 10, disposed at the approximate longitudinal center line of the implement, and designed to pass through the soil at opposite sides of the growing beet. The two shovels uproot the beet, and the latter passes, butt-end first, to the rear, and is guided by means of the tines 11 secured at the rear of the shovels and projecting rearwardly therefrom.

The two shovels that form the puller for the beets are fixed at the lower ends of the curved plow beams 12, and the upper or front ends of the two beams are supported on a bushing 13 by means of the two laterally extending trunnions 14 rigid with the bushing and forming pivotal supports for the front ends of the beams.

The bushing surrounds, and is vertically movable on, an upright pin 15, and the upper and lower ends of this pin are journaled in slide blocks 16 and 16', the upper block being slidable, laterally in angular guide 17 and the lower block being also slidable with the upper block, in a complementary guide 18. The bushing 13, pin 15, and the slide blocks 16 and 16' form a bearing-head of the swivel type for the plow beams which head is laterally adjustable in the guides 17 and 18. These upper and lower guides are fashioned from angle iron plates, at the ends of which plates are fastened side plates 19, the whole forming a rigid cross head extending transversely of the implement, and the cross head is fastened on top of the cross bar 20 that is rigidly secured by bolts 21 to the section 2 of the main frame 1.

Within the rigid cross head we thus provide a pivotal support for the front ends of the plow beams, whereby the puller may be adjusted with relation to the depth of the beets in the soil, and also by means of which the puller frame or plow beams may be lifted for the purpose of entirely removing the puller from the ground, as when the implement is being transported from one field to another, or for turning corners in the field.

For laterally adjusting or steering the puller we employ pedal means, or a foot-lever that is positioned where it is readily accessible to the driver who occupies the seat 8. The bushing 13, at its front, is provided with a rigid or integral arm 22 which projects forwardly therefrom, and by means of knuckle joints 23 and 24 and a crank arm 25, this arm 22 is flexibly connected with the front, free end of a foot lever 26 that extends to the rear and is provided with a cross arm 27, which arm is pivoted at 28 on one of the cross braces of the main frame. Thus it will be apparent that the driver, by means of both feet in contact with the ends of the cross arm of the foot lever, may swing the lever in a horizontal plane for the purpose of swinging the puller and its frames laterally of the steering head of the puller. It will be understood that the driver, with both feet on the foot lever at all times, not only operates the foot lever to laterally adjust the position of the bearing head, but he also holds the lever in adjusted position.

For lifting the puller entirely from the soil or the ground level, and for adjusting the puller with relation to the growing beets we employ a manually operated crank shaft 29 that extends transversely of the implement and is journaled in bearings 30 rigidly fastened to the front section of the main frame. The crank shaft passes freely through a pair of slotted plates 31, one rigidly fastened to each plow beam, and the downturned arm 32 of the crank shaft is pivoted at 33 to a link 34 that extends rearwardly to and is pivoted on the hand lever 35. The hand lever is pivoted on a usual rack or segment 36 which is rigid with the cross brace or bar 3, and the hand lever is located in position readily accessible for the driver occupying the seat 8.

As the beet is uprooted from the ground, it is passed to the rear over the guiding tines 11 of the puller, and while on the tines, the beet is conveyed, in its initial movement, upwardly and rearwardly, from the tines, through an inclined elevator, located at the approximate longitudinal center of the implement, which elevator comprises an upper endless conveyer and a lower endless conveyer, spaced apart sufficiently to permit the beets to be conveyed therebetween. The endless conveyers of the elevator comprise two chains 37 and 38, and these chains are equipped with spaced gripping cleats 39 and 40 that are arranged and related in such manner that the cleats of the upper chain and the cleats of the lower chain co-operate together as grippers to clasp a beet and carry it through the elevator. The beet, it will be understood passes from the tines 11 butt-end first, and the grippers 39 and 40 contact with the upper and lower surfaces of the beet with such frictional engagement as to convey or carry the beet upwardly and rearwardly through the elevator.

The endless chains are supported in frames 41 and 42 respectively, and sprocket wheels 43 and 44 are journaled in the front ends of these frames for the chains to pass over and around. At the rear, upper end of the elevator these chains 37 and 38 pass around sprocket wheels 45 and 46 on the shafts 47 and 48 that extend transversely of the implement and are journaled in bearings B at the upper end of a post or upright frame A rigidly supported at the top of the main frame.

The rear ends of the conveyers and their frames are spaced apart by side plates 49, and it will be understood that these side plates have pivotal support on the two shafts 47 and 48, the shaft 47 being a movable pivot and the shaft 48 being a fixed pivotal point, thereby permitting the upper conveyer to have a relative longitudinal movement above the lower conveyer of the elevator. By this means the upper conveyer may be advanced or retracted with relation to the lower conveyer for the purpose of adjusting the elevator and the grippers of the elevator to proper positions to compensate for the different conditions encountered in the growing beets. It will be understood that sugar beets vary in size as to diameter and length, and as to the length of the tops or foliage, and in some instances the size of the exposed portion of the growing beet also varies, i. e. the head of the beet may be level with the soil, or it may project as much as three or four inches above the soil. By adjusting the upper conveyer with relation to the lower conveyer, the elevator may be brought to its most efficient condition for the work to be performed.

For adjusting the upper conveyer we use a gear frame 50 rigidly secured to one of the side plates 49, and a gear shaft 51 is journaled in this frame with two bevel-gear-couples 52 and 53 forming the connection between the two shafts 47 and 48, thereby permitting the adjustment of the upper conveyer and at all times maintaining the transmission of power between the driving shafts of the two conveyers.

The gear frame is employed as an element in the control device for the upper conveyer, and a link 54 is pivotally connected to the frame at 55 and also pivotally connected to a hand lever 56 that is pivoted at 57 to the usual rack or segment rigid with the cross brace 3. As indicated the hand lever 56 is located in convenient position for use by the driver occupying the seat 8 and he may manipulate the lever as desired for adjusting the upper conveyer of the elevator.

The front, lower end of the elevator is flexibly connected with the plow beams, in order that the elevator may be lifted with the shovels entirely above the ground, or to permit vertical adjustment of the plows or shovels and the elevator with relation to the growing beets.

As a part of this flexible connection or coupling, the frame 42 of the lower conveyer is provided with a transversely arranged, U-shaped, yoke 58 rigidly attached at its ends to the frame 42 and this yoke passes over and encloses the upper conveyer. The yoke may provide a loose support for the upper conveyer, and to that end a series of holes 58a is provided in each side of the yoke, the holes of the two series being horizontally alined. A stud pin 59a may be inserted in each hole of an alined pair of holes, and each pin projects sufficiently at the inner side of the yoke to permit the one of the spaced plates of the frame 41 to rest on a stud. Thus the stud pins may be located in a selected pair of holes to limit the minimum space between the two conveyers, and these stud pins form a support for the conveyer frame 41 to slide on as the upper conveyer is being adjusted with relation to the lower conveyer.

The upper part of the yoke is equipped with a rigidly attached horn or coupling pin 59, projecting forwardly in a generally horizontal position, as best seen in Figure 6, to form part of a three-way joint with the plow beams. The coupling pin passes loosely through and is slidable in a pivot head 60, and the latter has laterally extending trunnions 61 that are pivoted in the swivel head 62, which latter head has a swivel bolt 63 that is pivotally mounted in the bearing head 64. The bearing head 64 is rigid with a U-shaped brace 65, which at its lower ends is bolted or otherwise rigidly fastened to the two plow beams 12. The upright brace 65 extends transversely of the implement and it rigidly connects the two beams 12. Thus it will be apparent that when the plow frame or puller frame and puller are lifted from the ground, the elevator is also lifted, but because of the flexible connection between the coupling pin and the brace, the upper elevator-conveyer may be adjusted with relation to the lower conveyer, and the puller frame may also be adjusted laterally without disturbing the elevator.

As the beets are conveyed through the elevator they pass through a grating or open trough made up of wire rods 66 that are mounted in the lower conveyer in position to guide the beets and at the same time permit the soil or dirt to break away from the beets and fall to the ground, before the beets reach the topping mechanism at the rear of the implement.

The endless chains of the elevator and the topping mechanism are supplied with power from a suitable motor, indicated in a conventional manner as 67 and supported on the frame of the implement in a convenient position. Power is transmitted from the motor through a chain drive 68 to the sprocket 69 on the power shaft 70 that is journaled in bearings, below and parallel with the elevator shaft 48, and a sprocket wheel 71, chain 72 and sprocket wheel 73 on the shaft 48 transmit power to the latter shaft for operating the elevator.

After the beets are elevated to the desired height they are successively discharged from the elevator to the topping mechanism located at the rear of the elevator, which topping mechanism comprises a rotary feed device, and a rotary cutter by means of which the tops of the beets are severed from the body of the beets.

The feed mechanism includes a fixed, circular, topping table 74 having sloping sides, and supported at the top of the post 75 that is in turn supported on the base 76, bolted to the frame of the implement, or to one of the cross braces 3 of the frame.

At 77 a portion of the topping table is cut away to provide a discharge opening through which the topped beets and the tops of the beets fall, and these parts are collected or gathered in suitable manner.

The beets are successively discharged from the elevator to the topping table, butt-end first, and the butt ends, as the beets slide down the sloping side of the table, encounter an inner, circular guide rim 78 at the bottom of the table which forms an abutment that supports the beet in a radially extending position as the beet is conveyed around a portion of the table. A portion of the table is cut away, and guide wires 79 are substituted for the solid wall of the table, over which wires the beets are carried and in their travel the loose dirt or soil remaining on the beets is dropped therefrom.

Above the topping table a fixed shelf 80, as best seen in Figure 1, is located, and supported, as indicated in Figure 7 at the upper end of a post or upright frame 81. At the under side of the circular shelf are arranged a series of spring fingers or presser wires 82, arranged in sets and supported from brackets 83. These presser fingers depend from the under side of the shelf and are of arcuate shape arranged concentrically with the topping table. The fingers are designed to bear down upon the beets as they are delivered to the table, and these spring fingers frictionally engage the beets as they are being fed or conveyed around the table from the elevator discharge to the rotary cutter, the spring fingers or pressers of course remaining stationary while the beets are pushed or conveyed around the table, and under the presser fingers.

The beets are conveyed or fed around the table by a rotary feeding device comprising a number of pushing or feeding devices, each of which includes a feed plate 84, as best seen in Figure 7, that travels around the inner side of the sloping wall of the table and these upright plates have their bottom edges substantially parallel with the sloping wall of the table. The plates radiate from the center of the table preferably on lines tangential to a small center circle of the table, that is, the outer end of the plate as it advances, is slightly advanced in front of the inner end of the plate, in order that the plate may adapt itself to the shape of the beet as it is being propelled or fed around the table, and the upper edges of these plates are notched as at 85 to perform the function as guides for the spring presser fingers or wires, and to accommodate these wires as they bear down on the beets.

Each plate is mounted on a holder or frame 86 and the latter is mounted at 87 on the outer, upper end of a radial arm 88 that supports the feed plate and its holder above the table, while the arm itself extends downwardly, under the table, toward the center thereof where the arm is secured to a hub 89. The radial arms supporting the holders and feed plates and the hub thus form a rotary spider frame, of which the hub is fastened by set bolt 90 to a rotary sleeve 91 which surrounds the post 75 and is journaled to revolve in the base 76 of the post. The sleeve is also supported by the bearing head 92, and the latter is braced in suitable manner from the main frame of the implement.

The sleeve and the spider frame are rotated through the instrumentality of a central gear 93 keyed on the sleeve and mounted above the base 75, and this gear is turned by means of the pinion 94 on the pinion shaft 95 that extends transversely of the implement and is journaled in suitable bearings supported on the main frame, or on a cross brace 3 of the frame. By means of a sprocket wheel 96 on shaft 95, the chain 97 and the sprocket wheel 98 on the shaft 70, power is transmitted from the latter shaft to revolve the spider frame and the feed devices thereon.

As will be evident from an inspection of the topping assembly in Figure 1, the beets are conveyed around the topping table through a distance of approximately two hundred and seventy degrees, and then while pressed down by the presser fingers on the table, with the beet-top resting on the topping rim 78, and with the feed plate at the rear of the beet, the top of the beet is severed by means of a rotary cutter or cutting disk 99 located in proper position for the purpose.

The cutter is mounted at the lower free end of a rotary shaft 100 journaled in the frame 101, and this frame is rigidly supported at the upper end of the post or upright frame 81. Above the table and above the shelf 80, the shaft 100 is provided with a bevel pinion 101a that meshes with a complementary pinion 102 mounted on the horizontally disposed shaft 103, and the latter is journaled in bearings 104 of the frame 101.

A sprocket wheel 105 is mounted on the outer end of the shaft 103, and a sprocket chain 106 extends down from this sprocket wheel to the sprocket wheel 107 mounted on the outer end of a shaft 108 journaled in suitable bearings on the main frame and axially alined with the shaft 95 at the opposite side of the implement. At the inner end of the shaft 108 a bevel pinion 109 is mounted for engagement with the driving gear 93.

The operating mechanism of the elevator, the feed mechanism, and the operating mechanism of the rotary cutter, are timed or synchronized so that the successive beets are delivered to the feed mechanism and by the feed mechanism they are delivered to the topping mechanism or cutter in such manner that the beets are uniformly and continuously fed to the cutter, and their tops are severed, successively, thereby insuring a smooth and reliable operation of the implement.

We claim:

1. The combination in a beet harvester with a vehicle frame, of a plow frame, a bearing head and means for laterally adjusting said head laterally of the vehicle frame, a horizontal pivot support for the plow frame on said head and means for adjusting the plow frame on its pivot, an elevator supported at the rear of the plow frame, and a flexible connection between said elevator and the plow frame.

2. The combination in a beet harvester with a vehicle frame, a laterally adjustable bearing head mounted in said frame, and means for retaining said head in adjusted position, of a plow frame, a pivotal connection between said plow frame and the head, means for adjusting the plow frame on its pivot, an elevator supported at the rear of the plow frame, said elevator comprising a pair of endless conveyers, and a flexible connection between one of said conveyers and the plow frame.

3. The combination in a beet harvester with a vehicle frame, of a laterally adjustable swivel-head mounted in the frame and means for retaining the head in adjusted position, a plow frame, a horizontal pivot-connection between said plow frame and the swivel-head, means for adjusting the plow frame on its pivot-connection, a pivoted elevator supported at the rear of the plow frame, and a flexible supporting connection between said elevator and the plow frame.

4. The combination in a beet harvester with a vehicle frame having a front cross-head, of a laterally adjustable swivel head mounted in the cross head, means for adjusting the swivel-head, a plow frame and its plow, a horizontal pivotal-connection between the plow frame and said swivel head, and means for vertically adjusting the plow frame.

5. The combination in a beet harvester with a vehicle frame having a front cross head, of a laterally movable swivel-head mounted in the cross head, pedal actuated mechanism for moving said swivel-head, a plow frame and its plow, a horizontal pivotal-connection between the plow frame and the swivel-head, a slotted guide arm on the plow frame, a crank operatively connected with said slotted guide arm, and manually operated means for turning said crank.

6. The combination in a beet harvester with a vehicle frame and a cross head thereon, of a laterally movable swivel-head mounted in the cross head and means for moving said swivel head, a plow-frame and its plow, a pivotal connection between said plow frame and the swivel-head, and means for swinging the plow frame on its pivotal connection.

7. In a beet harvester, the combination with a vehicle frame, an adjustable front plow frame, and an adjustable rear elevator frame, of a pair of parallel conveyers having rear, spaced pivotal supports on the elevator frame, co-acting means on the plow frame and the front end of the lower conveyer for supporting the latter, means for adjusting the elevator frame, and means for operating the conveyers.

8. In a beet harvester, the combination with a vehicle frame, a pivotally supported adjustable plow frame, and a pivotally supported elevator frame, of a pair of parallel conveyers having rear, spaced pivotal supports on the elevator frame, co-acting means on the plow frame and the lower conveyer for supporting the front end of the latter, means for adjusting the elevator frame, means for adjusting the plow frame, and means for operating the conveyers.

9. In a beet harvester, the combination with a vehicle frame, a pivotally supported adjustable plow frame and a pivotally supported elevator frame, of a pair of conveyer frames, vertically spaced pivotal supports at the rear ends of the conveyer frames on the elevator frame, a pair of endless chain conveyers mounted in the conveyer frames and forming an elevator, means for operating the conveyer chains, means for adjusting the elevator frame, means for adjusting the plow frame, and a flexible connection between the lower conveyer frame and said plow frame.

10. In a beet harvester, the combination with a vehicle frame, an adjustable front plow frame and means for adjusting said frame, a rear elevator frame pivotally connected to the vehicle frame, and means for adjusting the elevator frame, of a pair of parallel conveyers having rear, spaced pivotal supports on the elevator frame, a yoke on the front end of the lower conveyer enclosing the upper conveyer, a loose connection between said yoke and the plow frame for supporting the conveyers, and means for operating the conveyers.

DWIGHT F. HALL.
WALTER A. MORKERT.